United States Patent [19]

Rosenberg

[11] 4,182,517

[45] Jan. 8, 1980

[54] ARTICULATED PARALLELOGRAM PHONOGRAPH TONEARM

[76] Inventor: Adam N. Rosenberg, Dept. of Operation Research, Stanford Univ., Stanford, Calif. 94305

[21] Appl. No.: 906,127

[22] Filed: May 15, 1978

[51] Int. Cl.² ............................................. G11B 3/12
[52] U.S. Cl. .................................................. 274/23 R
[58] Field of Search .................... 274/23 R, 34, 35, 29

[56] References Cited

U.S. PATENT DOCUMENTS

| | | | |
|---|---|---|---|
| 559,806 | 5/1896 | MacDonald | 274/34 X |
| 814,839 | 3/1906 | Gray | 274/34 X |
| 2,946,596 | 7/1960 | Bajalaz | 274/23 R |
| 3,734,511 | 5/1973 | Rabinow | 274/23 R X |
| 3,956,581 | 5/1976 | Taylor | 274/23 R X |

Primary Examiner—Charles E. Phillips
Attorney, Agent, or Firm—Richard C. Woodbridge

[57] ABSTRACT

An articulated phonograph tonearm includes a multipivot parallelogram linkage means for supporting the phonograph cartridge. The linkage means is mounted at one end of a rigid beam. The beam is constrained to move in a plane parallel to the surface of the record and the parallelogram linkage structure forces the cartridge to remain in the same plane as it moves over warps. A stylus is attached to the cartridge and is adapted to ride in the grooves of the record. The stylus rotates about a virtual center which is preferably located on the surface of the record. Several alternative linkage structures are also disclosed. The apparatus is especially effective in minimizing the undesirable effects associated with record warp.

6 Claims, 15 Drawing Figures

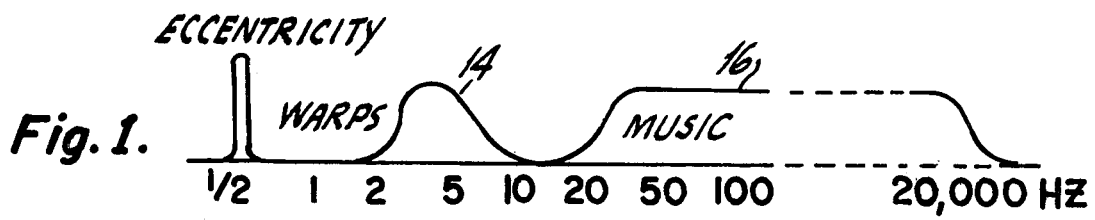
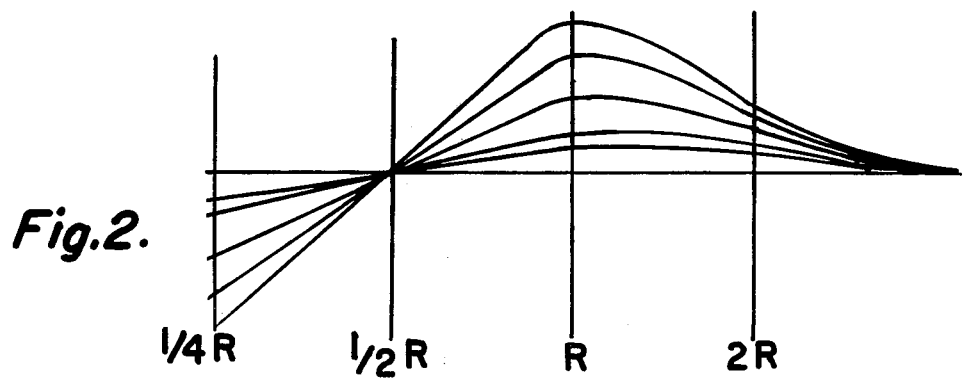
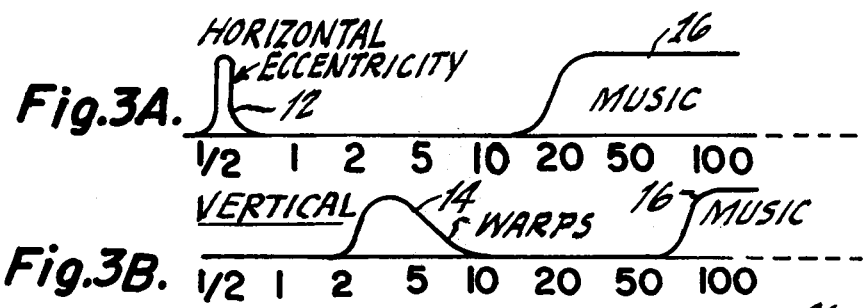
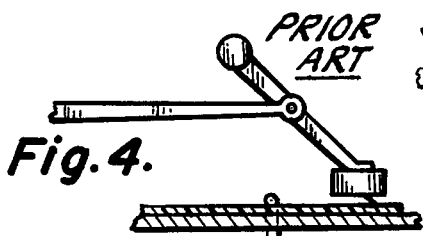
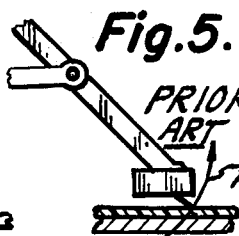
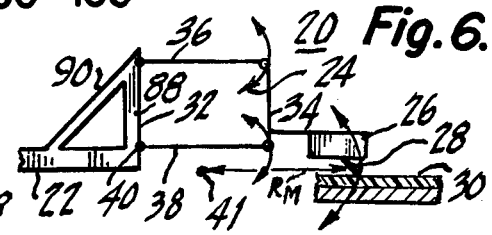
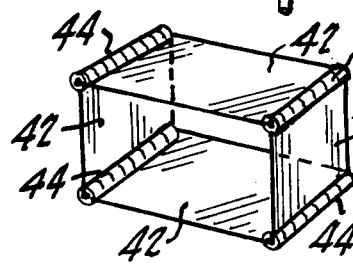
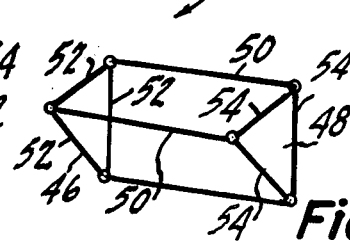
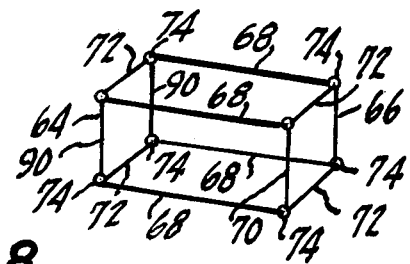
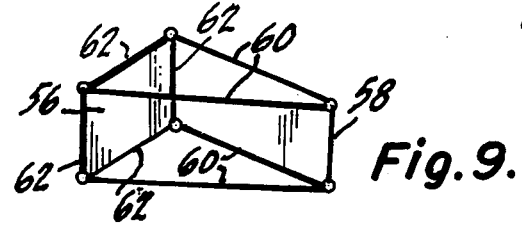

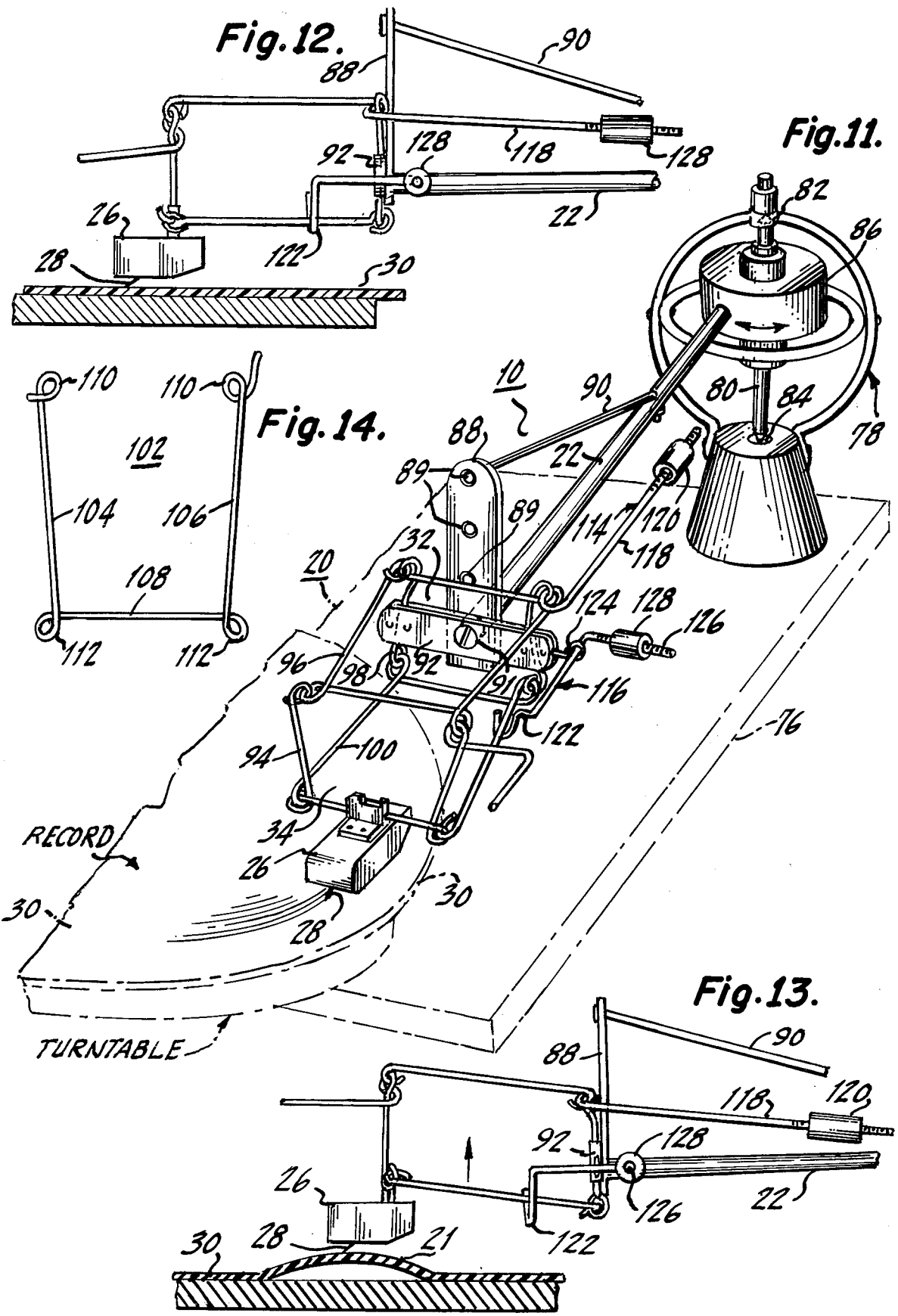

ARTICULATED PARALLELOGRAM PHONOGRAPH TONEARM

BACKGROUND OF THE INVENTION

1. Field of the Invention

This invention relates to an articulated phonograph tonearm wherein the motion of the phonograph cartridge is controlled by a parallelogram-type of linkage structure.

2. Description of the Prior Art

The problem of minimizing distortion due to warped phonograph records is one that has received some attention by previous inventors. For example, U.S. Pat. No. 3,734,511 by Jacob Rabinow discloses a tonearm system in which the cartridge is supported by four strings so that the stylus automatically moves up and down in a straight line whenever a warped section of a record is played. See column 1, lines 23 through 34. Note also Rabinow U.S. Pat. Nos. 3,776,556 and 3,830,505 which dislose other tonearms which can operate upon warped records.

U.S. Pat. No. 3,485,501 to Baker discloses a tonearm using a four bar linkage. Note the abstract. The one drawback of that kind of structure is that it does not maintain the cartridge at a constant angle whenever the height of the record is varied.

Muller, U.S. Pat. No. 3,907,306 and German Pat. No. 2,432,639 disclose one kind of articulated tonearm, the Vestigal. The Vestigal is manufactured by Transcription, Penthouse G, 330 W. 58th Street, New York, N.Y. 10019. That type of tonearm appears to adjust to varying record heights, but includes structure quite different from the present invention. British Pat. No. 904,218 to Thorens is of interest in that it appears to disclose a relatively sophisticated and complicated mechanism including a plurality of linkages for supporting a phonograph cartridge. It is noted in particular that Thorens' patent refers to a first and second deformable parallelogram structure. However, the device otherwise appears to be quite different in function and shape from the present invention. The Dynavector is almost identical in principle to the Vestigal but has more damping. Many people consider the Dynavector to be one of the better tonearms on the market. The Dynavector is manufactured by Onlife Research, Inc., Tokyo, Japan and distributed in the U.S.A. by Audioanalyst, Inc., P.O. Box 262, Brookfield, Conn. 06804.

SUMMARY OF THE INVENTION

Basically described, the invention comprises an articulated phonograph tonearm which is specially adapted to play phonograph records having appreciable warp. Virtually all conventional phonograph records have a detectable amount of warp. The undesirable effects of warp can be significantly minimized by a well designed tonearm. According to the present invention a parallelogram linkage structure is supported on a rigid beam which is rotatably connected at one end to a pair of oppositely positioned needle bearings. Therefore, the beam will rotate only in a plane that is horizontal to the surface of the record. The parallelogram linkage is connected to the beam at the end furthest removed from the pivot mechanism. According to the preferred embodiment of the invention the parallelogram linkage structure comprises four U-shaped wire members connected continuously in a top-to-bottom fashion so as to create a flexible box-like manner. A phonograph cartridge is suspended at the end of the parallelogram structure. The structure keeps the cartridge and stylus at a constant angle with respect to the warped record. A damping and a counterweight mechanism can be employed to optimize the response of the device. Several other multilinkage systems are also disclosed which may accomplish the same or similar results.

The foregoing invention will be more fully understood with reference to the following drawings which are a part of this disclosure.

BRIEF DESCRIPTION OF THE DRAWINGS

FIG. 1 is a graph illustrating the frequency ranges of record eccentricity, warps and music as found on a conventional phonograph record.

FIG. 2 is a graph of frequency response as a function of the amount of damping in the tonearm.

FIG. 3A is a graph of the horizontal information components of a typical prior art phonograph record.

FIG. 3B is a graph of the vertical information components of a typical phonograph record.

FIG. 4 is a stylized description of a prior art articulated phonograph tonearm.

FIG. 5 is a detailed view illustrating the motion of a stylus on a typical prior art articulated phonograph tonearm.

FIG. 6 is a simplified, schematic view of the preferred embodiment of the present invention.

FIG. 7 is a schematic view of an alternative embodiment of the present invention in which the linkage members are flat and connected together by elongated hinge elements.

FIG. 8 is another alternative embodiment of the present invention in which the linkage structure has a prism shape.

FIG. 9 is another alternative embodiment of the present invention in which the linkage is wedge-shaped in nature.

FIG. 10 is a perspective schematic view of the parallelogram linkage 20 of the present invention.

FIG. 11 is a perspective view of the tonearm apparatus of the present invention.

FIG. 12 is a side elevational view of the tonearm of the present invention showing the cartridge tracking a relatively flat phonograph record.

FIG. 13 is a side elevational view of the tonearm of the present invention illustrating the manner in which the cartridge rides over a warped section.

FIG. 14 is a detailed view of one of the U-shaped brackets which comprise the parallelogram linkage structure.

DETAILED DESCRIPTION OF THE INVENTION

During the course of this description like numbers will be used to indicate like elements according to the different views of the invention.

The details of the present invention can be more easily understood in the context of the following basic phonograph theory and technology. The purpose of a conventional stereo system is to amplify and reproduce as sound all of the desirable content of a particular given sound source as realistically as possible. For the purposes of this description, the source is a phonograph record and music is the desirable content which is to be realistically reproduced.

The signal received by the electronic portion of a conventional stereo system is directly proportional to the motion of the stylus relative to the cartridge. Assuming that the stylus stays in the groove and that the cartridge is firmly attached to the tonearm, then the electronic signal received by the stereo system corresponds directly to the changing displacement of the groove and the tonearm.

The signal produced by the phonograph cartridge is best if needle movement is kept to a minimum. Under those conditions the needle tracks better, and there is less intermodulation distortion. Intermodulation distortion is distortion caused by the change in the reproduction of a high frequency because of the oscillations of a low frequency. Also, the cartridge has some optimal tracking force and tracking force varies according to the spring tendencies of the stylus mount if the stylus moves.

Accordingly, the ideal tonearm is one which could discriminate between noise and music. With regard to the noise, the tonearm should mechanically absorb that component so that the cartridge does not pick it up. However, with regard to music, the ideal tonearm would remain absolutely steady so that the music component is transferred 100% to the stylus. Under typical operating conditions, a conventional tonearm is expected to filter out noise below the audible frequency range. These noises are known as subsonic noise.

The frequency ranges of music, warps and record eccentricity are illustrated in FIG. 1. Curve 12 of FIG. 1 describes the frequency range of record eccentricity, curve 14 describes the frequency range of record warps and curve 16 describes the frequency range of the music information. The motion of the phonograph groove with respect to the tonearm is a function of the frequency of the signal. FIG. 2 illustrates some typical response characteristics. R is the resonant frequency of the tonearm apparatus, as determined by the mass of the tonearm and the springiness or compliance of the cartridge. The more the tonearm is damped, the flatter the resulting frequency response curve; conversely, the less the tonearm is damped, the greater the resonant peak in the curve. Accordingly, if an individual wishes to play music down to 30 Hz and filter out warps below 6 Hz, one must choose a resonance around 15 Hz and a very low amount of damping, thereby leaving the system far too susceptible to any vibration in the neighborhood of 10 Hz to 15 Hz.

The principle and theory of an articulated phonograph tonearm is that the horizontal and vertical information on a record can be separated from each other by employing a tonearm of the appropriate mechanical design. The horizontal information of a stereophonic phonograph record is the sum of the two stereo channels. Playing a record with the "mono" switch "on" plays only the horizontal portion of the groove signal. The vertical groove information is the difference between the two stereo channels. The vertical information is typically at a lower level than the horizontal information. This is desirable because most cartridges are at their worst when undergoing large vertical stylus movements.

It should be noted that the typical human ear has no directional sensitivity below 80 Hz and that record warps are almost always physical distortion in the vertical direction. Well cut records have the directional information below 80 Hz filtered out before it is pressed into the record. Even if such information is there it contributes little to the music, and puts an additional drain on the amplifier system.

FIG. 3A is a graph of the horizontal information associated with a typical stereophonic record groove and FIG. 3B illustrates the vertical information components for the same record. In order to minimize the effect of record warps it is desirable that the tonearm be much lighter in the vertical direction than in the horizontal direction. This in turn, means that the tonearm would have effectively two separate resonant frequencies, one horizontal and one vertical. Under such circumstances, it is easier to discriminate between music and warps because they are three octaves apart instead of only one octave.

A conventional prior art articulated tonearm is one that is in fact, effectively lighter in the vertical plane and heavier in the horizontal plane. This is achieved by placing a separate pivot for vertical motion at a position near the stylus as illustrated in FIG. 4. Such a structure and approach does clear up some problems associated with conventional cartridges.

The difficulty with this approach is that the pivot for vertical motion is located substantially above the surface of the phonograph record. That in turn means that as the stylus moves over the surface of the record, the path of the stylus is not vertical but is at an angle as illustrated by arrow 18 in FIG. 5. The horizontal component of the stylus as it moves up and down in turn means that the sound speeds up and slows down as the tonearm negotiates a warp. This phenomenon has been referred to as "warp-wow" and can be quite audible and annoying to an individual sensitive to such disturbances.

The present invention is successful in solving the warp-wow problem by placing the vertical motion pivot 41 quite close to the surface of the record. With a tonearm that is 250 mm long this would be no problem; however, with an articulated mechanism that is only 50 mm long, that can be a major difficulty. A workable solution to the problem is schematically illustrated in FIG. 6. The invention 20 includes a rigid arm 22, a multi-pivot linkage structure 24 and a phonograph cartridge 26 including a stylus 28. The stylus 28 rides in a groove, not illustrated, in record 30. The linkage structure 24 includes a first base section 12 and a second base section 34 to which the phonograph cartridge 26 is attached. An upper section 36 connects the tops of vertical links 32 and 34. A lower section 38 connects the lower portions of vertical links 32 and 34. In actuality linkage sections 32, 34, 36 and 38 comprise U-shaped members arranged as illustrated in FIGS. 10 and 11. If the radius of motion of the mechanism illustrated in FIG. 6 is approximately 50 mm, then the arm can move up or down 10 mm, as determinable by the Pythagorian relationship, before the stylus is 1 mm out of time, as opposed to less than 4 mm for existing articulated tonearms. The radius of the circle of mmotion $R_M$ is approximately the distance from virtual pivot center 41 to the tip of stylus 28. With the present articulated mechanism approximately 50 mm long the arm can move up and down about 5 mm while a conventional articulated arm is limited to less than 1 mm of travel. This is the design one would have to choose to avoid large amounts of warp-wow. Otherwise prior art tonearms can move as much as several centimeters. Another advantage of the present multi-pivot, parallelogram structure is that it permits the cartridge and stylus angle of attack to stay substantially constant as the warped record moves under the apparatus.

There are several possible alternative embodiments of the present invention. The linking structure can be rigid with hinges as illustrated in FIG. 7, for example. According to that embodiment the linkage members 42 comprise flat bar-like structures and the pivot sections between the flat bars 42 comprise elongated hinges 44. FIG. 8 illustrates a triangulated embodiment having a first end 46 and a second end 48 connected together by three bar lengths 50. The end sections 46 and 48 themselves comprise a plurality of links 52 and 54 respectively connected together in the form of a triangle. Yet another alternative embodiment is illustrated in FIG. 9 in which the multi-pivot linkage structure has the general shape of a cheese wedge. The wedge-shaped design of FIG. 9 includes a first square end 56 and a second single bar end 58 connected together by four links 60. The first square end 56 includes a plurality of conventional links 62.

The preferred embodiment of the present invention comprises a multi-pivot, parallelogram linkage structure in the form of a parallelpiped as illustrated schematically in FIG. 10. The design of FIG. 10 is preferable for a variety of reasons. First of all it is aesthetically appealing. Secondly, it lacks the concentrated tortional forces that might be associated with the alternative embodiments of FIGS. 7, 8 and 9. The parallelogram cage linkage structure of FIG. 10 includes a first square end 65 and a second square end 66 attached to each other by four parallel linkages 68 which all lie in a plane parallel to the plane of the record being played. A set of four vertical links 70 connect the lower horizontal links 68 with the upper horizontal links 68. Similarly, another set of links 72 connect the right-hand side link with the left-hand side links. There are eight pivot locations associated with the parallelogram structure of FIG. 10. Each of those eight locations, identified as points 74 comprise an intersection between one line 68, one line 70 and one link 72. Because the first face 64 of the parallelogram cage is rigidly held in a plane that is perpendicular to the plane of the record, the second face 66 is restricted to travel in a plane that is likewise perpendicular to the surface of the record.

The preferred embodiment of the present invention 10 is illustrated in a perspective view in FIG. 11. The multi-pivot articulated tonearm invention 10 is incorporated into an otherwise conventional turntable 76. Turntable 76 provides a base for horizontal pivot mounting means 78. Horizontal pivot 78 includes a pivot rod 80 having needle points at opposite ends thereof which are respectively received in an upper bearing socket 82 and a lower bearing socket 84. According to the preferred embodiment of the invention the pivot means 78 is similar in structure to a conventional toy gyroscope. It allows relatively frictionless rotation in a plane perpendicular to the axis of pivot rod 80. Pivot rod 80 includes a table-like mount 86 which supports the tonearm beam 22. Needle bearings 82 and 84 permit the tonearm 22 to travel in a plane that is substantially parallel to the plane of record 30. A rigid mast element 88 is attached to the end of beam 22 furthest removed from the horizontal pivot 78. Mast 88 is rigidly supported in a plane that is perpendicular to the average plane of record 30. A guy wire 90 attached to the top of mast 88 and to another point located on beam 22 helps to further insure stability of the mast element 88. A horizontal brace 92 is attached across the front of mast 88 and serves as an anchoring face for the first end 32 of the multi-pivot, parallelogram linking means 20.

Mast 88 includes a plurality of brace positioning holes 89. Therefore, brace 92 can be positioned up and down mast 88 by selectively placing mast positioning screw 91 in any one of the brace positioning holes 89. In this manner the linkage structure can be vertically adjusted to accomodate different turntable heights. Vertical height adjustment is important because it is desirable that the virtual center 41 be at the surface of the record and this occurs when the linkage elements are at right angles to each other during normal play. The dynamics of the device illustrated in FIGS. 11 through 14 are schematically illustrated in FIG. 6. Where possible, like numbers are used to indicated like elements for the purpose of improving clarity.

The flexible parallelogram linkage means 20 comprises four U-shaped wire-like elements 94, 96, 98 and 100 connected together in a top-to-bottom relationship so as to form a flexible box-like structure. A detail of a single U-shaped element is shown in FIG. 14. Each U-shaped element 102 comprises a first and a second side link 104 and 106 respectively and a common interconnecting bottom link 108. Each U-shaped member 102 also includes four pivot loops including a pair of top pivot loops 110 and a pair of bottom pivot loops 112. In forming the parallelogram linkage means 20 of the present invention the top loops 110 of one U-shaped bracket 102 are connected to the bottom loops 112 of the next succeeding U-shaped bracket. For example, the top loops 110 of U-shaped bracket 94 are connected to the bottom loops of 112 of the upper U-shaped bracket 96 and the top loops 110 of U-shaped bracket 96 are connected to the bottom loops 112 of U-shaped bracket 98, etc. U-shaped element 98 comprises the first base end 32 of linkage means 20 and is rigidly attached to crosspiece 92. In practice, element 98 may be sandwiched between two horizontal metallic strips and held in place by a pair of machine nuts and bolts. Accordingly, the first U-shaped bracket 98 is always held rigidly in a plane that is perpendicular to the plane of record 30. U-shaped bracket 94 comprises the second base end 34 of the parallelogram cage 20 and is virtually identical in shape to U-shaped bracket 98. In the same fashion U-shaped bracket 96 is virtually identical in shape to U-shaped bracket 100. These relationships are necessary so that bracket 94 always remains in a plane parallel to bracket 98 which in turn is always perpendicular to the plane of record 30. According to the preferred embodiment, horizontal U-shaped brackets 96 and 100 are approximately 50 mm long and vertical U-shaped brackets 94 and 98 are approximately 25 mm long. The ratio of two to one (2:1) is not believed to be critical. Therefore links 104 and 106 on brackets 96 and 100 are longer than links 104 and 106 on brackets 94 and 98. Accordingly, the parallelogram cage 20 can be rectangular in shape as long as the U-shaped brackets 94, 96, 98 and 100 retain the correct orthogonal relationship to one another.

Phonograph cartridge 26 is rigidly attached to bottom link 108 of U-shaped bracket 94 in such a fashion that the cartridge 26 lies in a plane perpendicular to links 104 and 106 and substantially horizontal to the plane of record 30. Because of the flexible parallelogram relationship of linkage means 20 the cartridge 26 always remains parallel to the general plane of record 30 even when travelling over warps. Therefore, the angle of attack of the stylus 28 with regard to the surface of record 30 remains substantially the same. This feature of the invention is clearly shown in FIGS. 12 and 13. In FIG. 12 the cartidge 26 is shown playing on the surface of a relatively flat record. In FIG. 13 the cartridge has been lifted above the surface of the record as it plays over a record warp 31. Note that the top of the cartirdge 26 in both FIGS. 12 and 13 remains substantially level to the general plane of the record 30. Accordingly, the angle of attack of stylus 28 remains virtually the same during normal level play as shown in FIG. 12 and during warp play as shown in FIG. 13. It should be mentioned that the cartridge 26 may be kept at some angular relationship other than horizontal if it provides better response. The present invention tends to greatly eliminate the angle of attack problem associated with many prior art devices.

Also associated with the device of the present invention is a counterweight, i.e. counterbalance, mechanism 114 and a frictional damping mechanism 116. The counterweight mechanism 114 comprises a rigid extension member 118 of link 106 of upper U-shaped wire element 96. The extension 118 is adapted to receive one or more counterweight elements 120. The counterweights may be clip-on or screw-on or any of a variety of known elements. The purpose of the counterweight mechanism 114 is to be able to adjust the weight on stylus 28 so as to obtain optimum sound reproduction.

Damping mechanism 116 comprises a hook element 122 which is pivotally attached to a mounting bracket 124 which in turn is rigidly connected to cross piece 92. A counterweight 126 is attached to the opposite end of hook 122 and is adapted to accomodate one or more counterbalance weights 128. The purpose of damping mechanism 116 is to help frictionally damp out undesirable oscillation in the mechanism. Hook 112 cradles link arm 106 of the bottom U-shaped bracket 100. Weight 128 allows the damping force of mechanism 116 to be adjusted with certain limits. One side of hook 122 rubs up against lower U-shaped bracket 100. The frictional rubbing force is directly proportional to the size of weight 128. Therefore, damping mechanism 116 operates by horizontally forcing hook 122 into frictional engagement with bracket 100 thereby adding vertical drag to the entire linkage system. Damping mechanism 116 also forces the parallelogram linkage means 120 to bottom out at a specific predetermined level. In operation the mechanism described in FIGS. 10 through 14 operates along the lines of the principles described with respect to FIG. 6.

The following analysis indicates how the structure of the invention reduces the warp-wow associated with prior art systems.

With regard to warp-wow, suppose the path of the stylus, as the tonearm moves up and down, is a straight line that is not quite vertical, but is slanted at an angle PHI from the vertical. That would be the case with many conventional prior art tonearms and all prior art articulated tonearms. This will happen if the line from pivot to stylus is slanted at an angle PHI to the horizontal. Suppose that a warp is rising and then falling with velocity u. Then the horizontal motion of the stylus will be at a velocity u sin PHI. Further, suppose the record is moving at a velocity v past the stylus. Then the wow or flutter caused will be $$F = u \sin [PHI/v]$$

If a warp is 1 mm high on the outside of a record, and is a half second from bottom to top to bottom, then u=5 mm/sec and v=500 mm/sec are reasonable approximations. If the vertical sub-tonearm is 50 mm long and the pivot is 12 mm off the record, then PHI=15° and sin-PHI=0.25. F=5(0.25)/500=0.004=0.4%. Many inexpensive stereo cassette tape recorders do better than that.

Assuming a 50=mm sub-tonearm with a tolerance of 0.05% for F for this relatively normal sized warp, the pivot must be within 1.5 mm of the record surface.

If a linkage that creates a virtual pivot is used, then the pivot can be placed right where the record surface is, meaning that only the circular effects are left. The linkage means of the present invention creates this effect. This effect comes about because the motion is not a straight line, but an arc of a circle. In this case, the formula is $$F = (u/v)(W/L)$$

where
W=the weight of the warp
L=the length of the vertical sub-tonearm

In the case of the 1 mm warp (W=1) at 5 mm/sec (u=5) on the outside of the record (v=500) with a 50 mm sub-tonearm (L=50) this yields F=(5/500)(1/50)=0.0002=0.02% which is more reasonable. As seen from FIG. 6 the virtual pivot 41 lies on the surface of record 30.

The angle of the cartridge in the groove is crucial. A change of as little as 0°20' of arc creates noticeable changes in the sound, particularly on the inner groove of a record. A change in height of as little of 1 mm with a 50 mm sub-tonearm will change the tracking angle by about 1°.

the same linkage that enables a virtual pivot to be placed on the record surface itself also permits the cartridge angle to remain completely constant while it is riding up and down on a warp. More importantly, it enables the angle to remain constant from thin records to thick records, which can differ in height by as much as 1 mm.

There are other possible changes that could be made to the invention. For example, frictional damping mechanism 116 could be replaced with an appropriate fluid mechanism. Counterbalance weights 120 and 128 can be provided by a variety of other different elements such as springs. Likewise the horizontal pivot mechanism 78 could comprise a variety of devices other than a pair of oppositely situated needle bearings. In view of the foregoing, it will be clear to those of ordinary skill in the art that modifications can be made to the structure and function of various different parts of the device without departing from the spirit and scope of the invention.

I claim:

1. An articulated tonearm apparatus for minimizing the effects of warp on the surface of a phonograph record played on a turntable, said apparatus comprising:
   a mounting means for attaching said apparatus to said turntable, said mounting means including a pivot means;
   a beam connected to said pivot means and constrained by said pivot means to rotate in a plane substantially parallel to the surface of said phonograph record;
   a flexible multi-pivot parallelogram means connected to said beam at a point removed from said pivot means said parallelogram means including:
   a first base means connected to said beam and held in a relatively rigid position with respect to the surface of said phonograph record, said first base means having at least two corners thereon;

at least two linkage means respectively connected to at least two of said corners of said first base means; and, a second base means having at least two corners thereon, at least two of said corners of said second base means being connected to the ends of said at least two linkage means furthest removed from said first base means, wherein said second base means always lies in a plane substantially parallel to the plane of said first base means;

a phonograph cartridge means connected to said second base means; and, a stylus means attached to said cartridge means for detecting information on the surface of said record, said stylus means being connected to said second base means in such a fashion as to be constrained to travel in an arc having a virtual center which lies substantially on the surface of said record.

2. The apparatus of claim 1 wherein said parallelogram means comprises four linkage means and said first base means and said second base means each respectively have four corners; and wherein said first and second base means include a first and second U-shaped wire means respectively; and, said four linkage means include a third and fourth U-shaped wire means, said U-shaped wire means all being respectively connected top-to-bottom to each other in such a fashion as to create a flexible box-like structure; and, wherein said cartridge is rigidly connected to said second U-shaped wire means.

3. The apparatus of claim 2 further including:

a frictional damping means connected to said apparatus for damping out undesirable oscillations in said parallelogram means.

4. The apparatus of claim 3 wherein said frictional damping means comprises a hook-like apparatus pivotally connected at one end to a support connected to said apparatus and which includes a hook-shaped section which may be selectively located within the travel path of one of said four linkage means and which frictionally engages one of said four linkage means.

5. The apparatus of claim 4 further including:

a counterweight mechanism comprising:

an extension rigidly connected to one of the four linkage means; and, a counterbalance weight means received on said extension.

6. The apparatus of claim 1 wherein said parallelogram means comprises:

a box-like structure having a first, second, third and fourth flat bar-like link, each being connected respectively to each other through a hinge means.

* * * * *